(12) United States Patent
Li et al.

(10) Patent No.: US 8,305,271 B2
(45) Date of Patent: Nov. 6, 2012

(54) CUCKOO HASHING TO STORE BEACON REFERENCE DATA

(75) Inventors: Jin Li, Bellevue, WA (US); Jyh-Han Lin, Mercer Island, WA (US); Aravind Krishnamachari Seshadri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 12/725,840

(22) Filed: Mar. 17, 2010

(65) Prior Publication Data

US 2011/0227790 A1 Sep. 22, 2011

(51) Int. Cl.
*G01S 1/08* (2006.01)
*G01S 3/02* (2006.01)
(52) U.S. Cl. ........................................ 342/386; 342/451
(58) Field of Classification Search .................. 342/385, 342/386, 451
See application file for complete search history.

(56) References Cited

U.S. PATENT DOCUMENTS

| | | | |
|---|---|---|---|
| 6,433,735 B1 * | 8/2002 | Bloebaum et al. | 342/357.43 |
| 2005/0187898 A1 | 8/2005 | Chazelle et al. | |
| 2006/0179071 A1 | 8/2006 | Panigrahy et al. | |
| 2007/0067108 A1 | 3/2007 | Buhler et al. | |
| 2008/0228691 A1 | 9/2008 | Shavit et al. | |

OTHER PUBLICATIONS

Checksum (Transact-SQL), http://msdn.microsoft.com/en-us/library/ms178565(v=sql.100).aspx.*
Askitis, N. "Fast and COmpact Hash Tables for Integer Keys," 2009, from Applic. IDS.*
Pagh, Rasmus, et al., "Cuckoo Hashing," available at http://cs.nyu.edu/courses/fall05/G22.3520-001/cuckoo-jour.pdf, Dec. 8, 2003, 27 pages.
Ho, Johnny Tsung Lin, et al., "PERG: A Scalable FPGA-based Pattern-matching Engine with Consolidated Bloomier Filters," available at http://www.ece.ubc.ca/~lemieux/publications/ho-fpt2008.pdf, 2008, 8 pages.
Askitis, Nikolas, "Fast and Compact Hash Tables for Integer Keys," available at http://crpit.com/confpapers/CRPITV91Askitis.pdf, 2009, 10 pages.
Kutzelnigg, Reinhard, et al., "Random Bipartite Graphs and their Application to Cuckoo Hashing," available at http://dmg.tuwien.ac.at/kutzelnigg/jsc_cuckoo.pdf, Oct. 8, 2009, 2 pages.

* cited by examiner

*Primary Examiner* — Gregory C Issing

(57) ABSTRACT

Storing and retrieving beacon reference data in a truncated cuckoo hash table. Checksums of beacon identifiers associated with beacons are used to retrieve beacon reference data describing locations of the beacons in a hash table. The data is stored in one or more hash tables by cuckoo hashing to eliminate aliasing. The hash tables are provided to devices such as mobile devices. The devices retrieve the beacon reference data from the tables based using beacon identifiers of observed beacons. Location information for the devices is inferred using the retrieved beacon reference data. The cuckoo hash tables consume less memory storage space and obfuscate the beacon reference data.

20 Claims, 3 Drawing Sheets

CUCKOO HASHING TO STORE BEACON REFERENCE DATA

BACKGROUND

Existing systems collect or determine beacon reference data describing the locations of beacons or other wireless access points. The beacon reference data includes, for example, location information for the beacons. The beacon reference data is distributed to mobile devices to enable the mobile devices to estimate their positions based on the locations of the beacons observed by the mobile devices. With the existing systems, the beacon reference data consumes a significant amount of the limited memory available on the mobile devices and also consumes a significant amount of bandwidth for distribution.

Some existing systems have attempted to reduce the size of the beacon reference data by compressing the beacon reference data. These systems further store beacon identifiers with the compressed beacon reference data. Because the beacon identifiers often consume more memory than the beacon reference data, such existing systems provide minimal reduction in memory consumption. Other existing systems store the beacon reference data in hash tables using the beacon identifiers as keys. In addition to providing minimal reduction in memory consumptions, these systems have privacy issues because users of the mobile devices are able to iterate through the hash tables to obtain the beacon reference data.

SUMMARY

Embodiments of the disclosure obtain beacon reference data for beacons from truncated cuckoo hash tables to infer a location of a computing device. Data associated with a beacon is accessed. The data includes a beacon identifier and beacon reference data describing a location of the beacon. A plurality of potential locations in a hash table is identified by a first computing device. A checksum of the beacon identifier is calculated. The first computing device performs cuckoo hashing to store the beacon reference data and the calculated checksum in one of the plurality of potential locations in the hash table. The first computing device distributes the hash table to a second computing device that retrieves the beacon reference data from the hash table via the calculated checksum.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
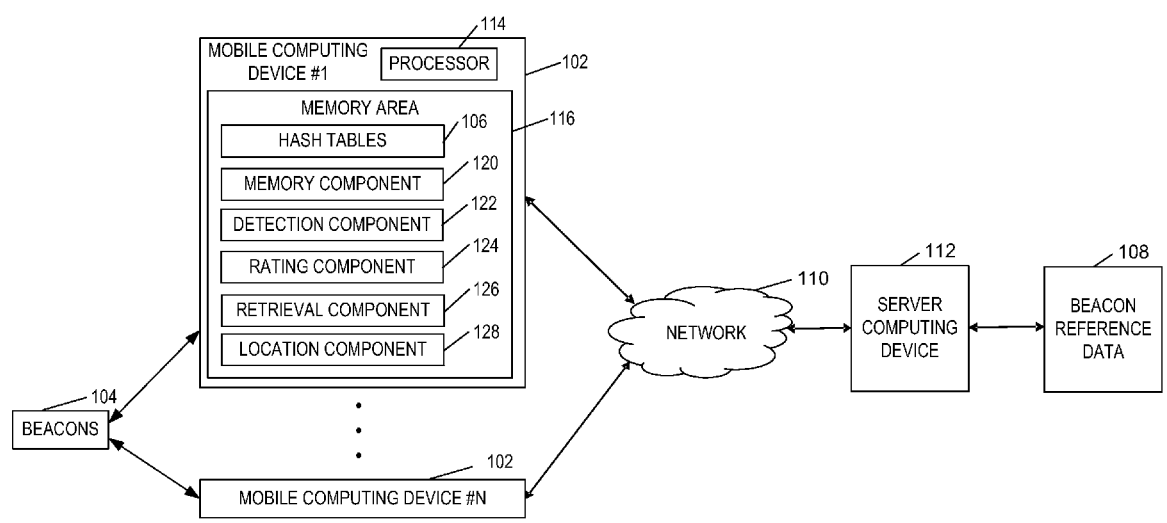
FIG. 1 is an exemplary block diagram illustrating mobile computing devices storing truncated cuckoo hash tables received from a server computing device.

Referring to the figures, embodiments of the disclosure store beacon reference data 108 for a beacon 104 in a truncated cuckoo hash table. In some embodiments, tiles of wireless access points (WAPs) for location retrieval are pre-distributed to devices such as client devices. As one of the client devices observes nearby beacons 104, the beacon identifiers of the beacons 104 are used to obtain the beacon reference data 108 for the observed beacons 104. The obtained beacon reference data 108 is used to infer a location of the client device.

Aspects of the disclosure reduce the memory storage amounts of the beacon reference data 108 by storing a checksum of each beacon identifier in a hash table rather than the actual beacon identifier. Further, by storing the checksum of the beacon identifier, aspects of the disclosure obfuscate the beacon reference data 108 by preventing users from mining the pre-distributed tiles to infer what beacons 104 are located at what locations. To reduce aliasing in the hash table, embodiments of the disclosure use cuckoo hashing to eliminate conflicts.

While described with reference to checksums as a means for hashing, obfuscating, or otherwise converting one value into another, aspects of the disclosure are not limited to computing checksums of the beacon identifiers. Rather, other computations are contemplated and within the scope of the disclosure.

Referring again to FIG. 1, an exemplary block diagram illustrates mobile computing devices 102 storing truncated cuckoo hash tables 106 received from a server computing device 112. The mobile computing devices 102 include, for example, mobile computing device #1 through mobile computing device #N. Exemplary mobile computing devices 102 include mobile telephones equipped with global positioning system (GPS) receivers. However, the mobile computing devices 102 include any device executing instructions (e.g., application programs) to store and access the truncated cuckoo hash tables 106. For example, the mobile computing devices 102 include portable computing devices such as laptops, netbooks, gaming devices, and/or portable media players. Further, each of the mobile computing devices 102 may represent a group of processing units or other computing devices.

The mobile computing devices 102 detect or observe one or more beacons 104 including cellular towers (or sectors if directional antennas are employed) and wireless fidelity (Wi-Fi) access points or other wireless access points (WAPs). As described in detail below, the mobile computing devices 102 then infer their location based on beacon reference data 108 associated with the observed beacons 104 as stored in the hash tables 106. While aspects of the disclosure may be described with reference to beacons 104 implementing protocols such as cellular transmission protocols and the 802.11 family of protocols, embodiments of the disclosure are operable with any beacon 104 capable of wireless communication.

The server computing device 112 communicates with the mobile computing devices 102 via a network 110. While described in the context of client-server communications, aspects of the disclosure are operable in other contexts such as peer-to-peer embodiments. The server computing device 112 stores, or has access to, data describing the approximate location of one or more of the beacons 104. The data is referred to as the beacon reference data 108. Alternatively or in addition, the beacon reference data 108 may be stored internal to the server computing device 112. In some embodiments, the beacon reference data 108 includes, for example, a longitude value, latitude value, and altitude value for the beacons 104.

The server computing device 112 includes any computing device that creates the truncated cuckoo hash tables 106 based on the beacon reference data 108. In the example of FIG. 1, the server computing device 112 also distributes the created hash tables 106 to the mobile computing devices 102.

Exemplary networks 110 include wired and/or wireless networks, and may represent local area networks or global networks providing, for example, access to the Internet. In embodiments in which the network 110 includes wireless networks, the server computing device 112 and the mobile computing devices 102 may be enabled with technology such as BLUETOOTH brand wireless communication services (secured or unsecured), radio frequency identification (RFID), wireless fidelity (Wi-Fi) such as peer-to-peer Wi-Fi, ZIGBEE brand wireless communication services, Z-WAVE brand wireless communication services, near field communication (NFC), and other technologies that enable short-range or long-range wireless communication.

Each of the mobile computing devices 102 further include at least one processor 114 and one or more computer-readable media such as a memory area 116. The processor 114 includes any quantity of processing units, and is programmed to execute computer-executable instructions for implementing aspects of the disclosure. The instructions may be performed by the processor 114 or by multiple processors executing within the mobile computing devices 102, or performed by a processor external to the computing device (e.g., by a cloud service). In some embodiments, the processor 114 is programmed to execute instructions such as those illustrated in the figures (e.g., FIG. 3).

The memory area 116 includes any quantity of media associated with or accessible to the mobile computing devices 102. The memory area 116 may be internal to the mobile computing devices 102 (as shown in FIG. 1), external to the mobile computing devices 102 (not shown), or both (not shown).

The memory area 116 further stores one or more computer-executable components for implementing aspects of the disclosure. Exemplary components include a memory component 120, a detection component 122, a rating component 124, a retrieval component 126, and a location component 128. Each of the mobile computing devices 102 executes the components to retrieve beacon reference data 108 from the hash tables 106 and determine a position of the mobile computing device 102. Operation of the components is discussed below. At least a portion of the functionality of the various elements in FIG. 1 may be performed by other elements in FIG. 1, or an entity (e.g., processor, web service, server, application program, computing device, etc.) not shown in FIG. 1.

Figure 2:
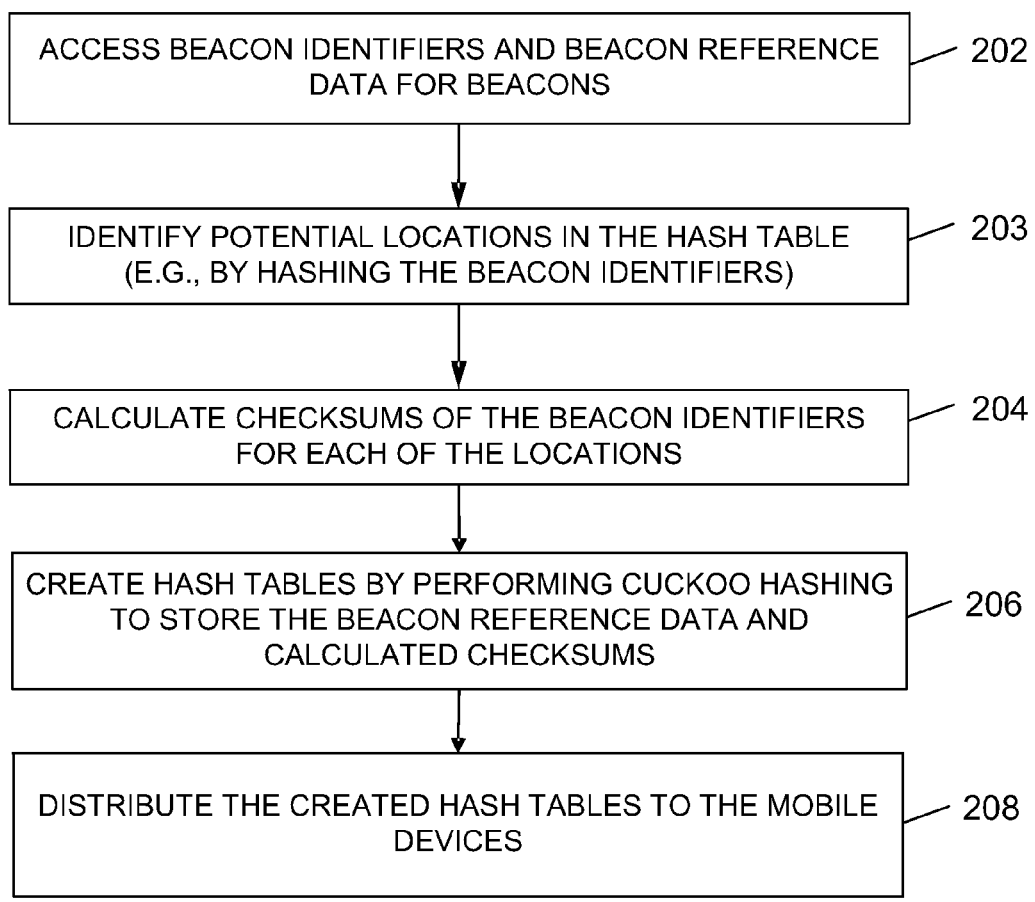
FIG. 2 is an exemplary flow chart illustrating creation and distribution of hash tables by cuckoo hashing beacon reference data.

Referring next to FIG. 2, an exemplary flow chart illustrates the server computing device 112 creating and distributing the hash tables 106 by cuckoo hashing the beacon reference data 108. In this example, the operations illustrated and described with reference to FIG. 2 are performed by the server computing device 112 (e.g., a first computing device). At 202, data associated with one or more beacons 104 is accessed. For each of the beacons 104, the accessed data includes a beacon identifier and the beacon reference data 108 describing a location of the beacon 104. Each of the beacon identifiers corresponds to one of the beacons 104. For example, each Wi-Fi beacon has a Basic Service Set Identifier (BSSID). In another example, each Global Service for Mobile communications (GSM) cellular tower includes a mobile country code (MCC), mobile network code (MNC), location area code (LAC), and a cell identifier. Universal Mobile Telecommunication System (UMTS) towers have beacon identifiers composed of MCC, MNC, and a cell identifier. Carrier Division Multiple Access (CDMA) towers have beacon identifiers composed of a system identifier, network identifier, and a base-station identifier. In an embodiment, the beacon identifier includes one or more of the BSSID and the service set identifier (SSID).

In some embodiments, data associated with a plurality of the beacons 104 is accessed. For example, the plurality of beacons 104 represents a tile of beacons 104 located within the same geographic area. Other groupings of the beacons 104 are contemplated. Each of the beacons 104 may be assigned to one of a plurality of locations or entries in the hash table. At 203, the potential locations in the hash table are identified. The available locations are identified by performing a defined quantity of hash functions or other computations using the beacon identifier as input. The output of the hash functions determines the possible or potential location in the hash table. Increasing the quantity of hash functions increases the quantity of potential locations in the hash table.

At 204, for each of the locations, a checksum of the beacon identifier for that location is calculated. For example, the operation may be represented by checksum (beacon identifier). At 206, cuckoo hashing is performed to store the beacon reference data 108 and calculated checksum for each of the beacons 104 in the truncated cuckoo hash table. Rather than storing the beacon identifier in the hash table, the calculated checksum is stored. Because the calculated checksum uses less memory than the beacon identifier, the resulting hash table uses less memory.

Figure 3:
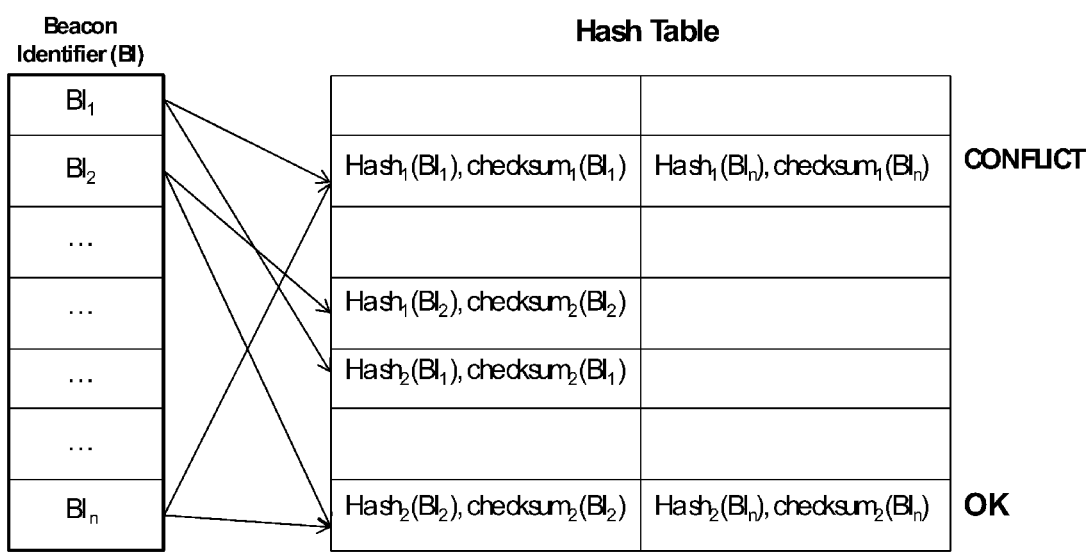
FIG. 3 is an exemplary block diagram illustrating aliasing in a truncated cuckoo hash table.

In some embodiments, cuckoo hashing includes selecting one of the identified potential locations in the hash table to store the calculated checksum and the corresponding beacon reference data 108. Aspects of the disclosure evaluate each of the potential locations for a particular beacon 104 to remove any conflicts. For example, each location is analyzed to determine whether the calculated checksum is the same as another checksum already assigned to or potentially assigned to the location. If more than one beacon identifier can be assigned to the same location with the same checksum, a conflict is declared and neither beacon identifier is assigned to that location. Among the available locations in the hash table, aspects of the disclosure confirm that the checksums stored in each location are unique relative to each other. After conflicts are identified and removed, aspects of the disclosure find a match between the beacon identifier and one of the potential locations such that each of the beacon identifiers is assigned to a unique location. FIG. 3 below illustrates and describes conflict elimination in cuckoo hashing.

In some embodiments, the beacon reference data 108 for the beacons 104 is stored in a single hash table. In other embodiments, a separate hash table is created for each tile, or grouping, of beacons 104.

Additional data may be stored as part of the beacon reference data 108. For example, the wireless channel of the beacon 104 and the observed signal strength may be stored.

As an example, each beacon has a 6-byte BSSID, a 4-byte SSID, a 2-byte longitude value, and a 2-byte latitude value (e.g., 14 bytes total for each beacon). Embodiments of the disclosure contemplate a 2-byte checksum of the BSSID and/or SSID so that the data stored equals the 2-byte checksum and the 4 bytes for the longitude and the latitude values (e.g., 6 bytes total for each beacon). As such, embodiments of the disclosure produce a one-half reduction in memory consumption.

After storing the beacon reference data 108 and corresponding checksums in one or more hash table, the hash tables 106 are distributed or otherwise provided to the mobile computing devices 102 (e.g., second computing devices) at 208. Some embodiments distribute the hash tables 106 based on a geographic area of the mobile computing devices 102, a mobility pattern of the mobile computing devices 102, a subscription profile of the mobile computing devices 102, or other criteria. For example, tiles corresponding to the home area code of each of the mobile computing devices 102 are provided to the mobile computing devices 102.

Each of the mobile computing devices 102 stores the received hash tables 106 in its local memory area (e.g., memory area 116). In other embodiments, the received hash tables 106 are stored in a memory area remote from, but accessible by, the mobile computing devices 102.

Each of the mobile computing devices 102 accesses the hash tables 106 to infer a location of the mobile computing device 102. For example, one of the mobile computing devices 102 detects one or more beacons 104 within proximity of the mobile computing device 102. The mobile computing device 102 calculates a plurality of potential locations by computing hash functions using the beacon identifiers for the detected beacons 104 as input. For each of the potential locations, checksums of the beacon identifiers associated with the detected beacons 104 are calculated. Using the calculated checksums, the mobile computing device 102 accesses the hash tables 106 to retrieve, obtain, or otherwise access the beacon reference data 108 associated with each of the detected beacons 104. For example, for each of the potential locations, if the checksum stored in that location in the hash table matches the calculated checksum of the beacon identifier for that location, the associated beacon reference data 108 is retrieved. Using the retrieved beacon reference data 108, the mobile computing device 102 determines a position of the mobile computing device 102 based on the positions of the detected beacons 104. If none of the checksums calculated from the beacon identifiers match the checksums stored in the hash table at the respective locations, aspects of the disclosure conclude that the beacon identifier is not present in the hash table and hence no beacon reference data 108 is retrieved.

In some embodiments, the mobile computing device 102 compares the retrieved beacon reference data 108 with domain information associated with the mobile computing device 102 to confirm or validate the retrieved beacon reference data 108. In this manner, the beacon reference data 108 is filtered to avoid false positive responses.

With reference to the components illustrated in FIG. 1, the memory component 120, when executed by the processor 114, causes the processor 114 to store a plurality of hash tables 106. Each of the hash tables 106 corresponds to a group of beacons 104. Each of the groups represents a geographic area (e.g., tile). The hash tables 106 store beacon reference data 108 associated with the beacons 104. Each of the beacons 104 has a beacon identifier. The plurality of hash tables 106 are created by performing cuckoo hashing to store the beacon reference data 108 and a checksum of the beacon identifier in one of a plurality of potential locations in the hash tables 106 such that no other beacon identifier having the same checksum is stored in that location.

The detection component 122, when executed by the processor 114, causes the processor 114 to detect one or more of the beacons 104 within proximity of the mobile computing device 102. The rating component 124, when executed by the processor 114, causes the processor 114 to calculate a score for each of the groups of beacons 104 based at least on the beacons 104 detected by the detection component 122, a beacon coverage rate, and an aliasing rate. Based on the calculated score, the rating component 124 further selects at least one of the plurality of hash tables 106.

In some embodiments, the score reflects a probability that a false positive (e.g., retrieving the wrong beacon reference data 108 due to aliasing) will occur using a particular group (e.g., tile) of beacons 104, and is based in part on whether the detected beacons 104 are within the group. The probability of false positives increases as the quantity of tiles cached by the mobile computing device 102 increases. Further, aliasing is more pronounced in areas of low coverage density (e.g., where more beacons 104 have not been previously observed).

An example score for a tile $S_i$ may be calculated as shown in Equation (1) below.

$$Q_i = \text{Probability} \quad (1)$$
$$(\text{beacon } w \text{ is an accurate match in tile } S_i \mid S_i(w) = \text{true})$$
$$= c_i / (c_i + \alpha(1 - c_i))$$

In Equation (1), $\alpha$ is the aliasing rate (e.g., ~1.56% if truncated to 1 byte, with 4 hash functions; 0.006% 2-byte checksum with 4 hash functions), $c_i$ is the beacon coverage rate (e.g., the estimated percentage of beacons known versus total number of beacons for tile $S_i$), and w is an observed beacon. The first term $c_i$ in the denominator represents the conditional probability that beacon w is in tile Si and is a known beacon (e.g., an accurate or true match). The second term $\alpha(1-c_i)$ represents the conditional probability that beacon w is in tile Si, is an unknown beacon, and $S_i(w)$=true (e.g., a false match to a known beacon likely to be in a very different and distant position in the tile).

Given a set of k observed beacons $(w_1, q_2, \ldots, w_k)$, the score for each tile $S_i$ is calculated as follows in the example of Equation (2).

$$\text{Score}(S_i \mid (w_1, w_2, \ldots, w_k)) = \Sigma_j Q_i \times S_i(w_j) = (c_i/(c_i + \alpha(1-c_i))) \Sigma_j S_i(w_j) \quad (2)$$

The higher the coverage rate and lower the aliasing rate, the higher the quality score $Q_i$ as shown by the example data in Table 1 below.

TABLE 1

Example Quality Scores.

| Coverage rate | Aliasing rate | Quality score |
|---|---|---|
| 90.000% | 1.563% | 0.998266898 |
| 90.000% | 0.006% | 0.999993218 |
| 50.000% | 1.563% | 0.984615385 |
| 50.000% | 0.006% | 0.999938969 |
| 10.000% | 1.563% | 0.876712329 |
| 10.000% | 0.006% | 0.999450985 |
| 1.000% | 1.563% | 0.392638037 |
| 1.000% | 0.006% | 0.993993812 |

Aspects of the disclosure then select the hash table corresponding to the tile with the highest score. The retrieval component 126, when executed by the processor 114, causes the processor 114 to identify potential locations in the selected hash table and calculate checksums of the beacon identifiers at the identified potential locations. The retrieval component 126 further obtains the beacon reference data 108 associated with the beacons 104 detected by the detection component 122 from the locations in the selected hash table whose checksums match the calculated checksums for that location. The location component 128, when executed by the processor 114, causes the processor 114 to determine a location of the mobile computing device 102 based on the beacon reference data 108 obtained by the retrieval component 126. In some embodiments, the location component 128 filters the obtained beacon reference data 108 by outlier elimination prior to determining the location of the mobile computing device 102.

In some embodiments, the operations illustrated in FIG. 2 are performed by the server computing device 112. In other embodiments, one or more of the operations illustrated in FIG. 2 are performed by another computing device (e.g., as a web service). In still other embodiments such as peer-to-peer embodiments, one or more of the operations illustrated in FIG. 2 are performed by the mobile computing device 102.

Further, the operations illustrated in FIG. 2 may be implemented as software instructions encoded on a computer-readable medium, in hardware programmed or designed to perform the operations, or both. As an example, the operations in FIG. 2 may be implemented as computer-executable components or other software.

Referring next to FIG. 3, an exemplary block diagram illustrates aliasing in a truncated cuckoo hash table. Cuckoo hashing avoids, at the encoding stage, conflicts between beacon identifiers that share the same checksum values. An exemplary method for cuckoo hashing is next described.

As shown in FIG. 3, a list of beacon identifiers is mapped to available entries or locations in a hash table. If an entry holds more than one beacon identifier with the same checksum, the links are removed from the beacon identifiers with that checksum to that entry to eliminate conflicts. In the example of FIG. 3, the checksum$_1$(BI$_1$) equals checksum$_1$(BI$_n$), indicating a conflict, so the links from BI$_1$ and BI$_n$ to this entry will be removed. Since checksum$_2$(BI$_2$) does not equal checksum$_2$(BI$_n$) in this example, there is no conflict at that location. In embodiments in which multiple hash tables 106 are provided to the mobile computing devices 102, such a uniqueness verification as described is performed across multiple hash tables 106 to avoid aliasing.

Aspects of the disclosure proceed to find a match between the beacon identifiers and the available entries as follows. The beacon identifiers are assigned (randomly or otherwise) to one of the respective, available (e.g., non-conflicting) entries that is not occupied. If the available entries are occupied for a given beacon identifier, the occupants therein are evaluated for relocation to an alternative entry. The relocation evaluation continues, at increasing depth, until available entries have been found for the beacon identifier and the occupants. The match process continues until the beacon identifiers have been assigned to a non-conflicting entry or when none of the occupants can be relocated (e.g., prompting an error message).

ADDITIONAL EXAMPLES

Some embodiments adjust the aliasing rate based on the coverage rate. For example, when the coverage is high, a higher aliasing rate (e.g., higher compression) may be tolerated to achieve greater reductions in memory storage consumption. Alternatively or in addition, the aliasing rate is weighted by a factor of $\lambda$ based on the perceived cost of false positives in different application scenarios. As an example, $\lambda$ is greater than one when false positives carry a high cost, while $\lambda$ is between zero and one if the cost of false positives is low. In such an embodiment, Equation (2) above is modified to include $\lambda$ as shown below in Equation (3).

$$Q_i = \text{Probability}(\text{beacon } w \text{ is a true match in tile } S_i | S_i(w) = \text{true}) = c_i/(c_i + \lambda\alpha(1-c_i)) \qquad (3)$$

While embodiments have been described with reference to data collected from users, aspects of the disclosure provide notice to the users of the collection of data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for obtaining the beacon reference data 108 for the beacons 104 from a cuckoo hash table to infer a location of the mobile computing device 102, and exemplary means for obtaining the beacon reference data 108 for beacons 104 from a cuckoo hash table using checksums of the beacon identifiers.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for obtaining beacon reference data for wireless access points from which to infer a location of a mobile computing device, said system comprising:
   a memory area storing a hash table, said hash table storing beacon reference data associated with at least one beacon, said beacon having a beacon identifier associated therewith, said hash table being created by performing cuckoo hashing to store the beacon reference data and a checksum of the beacon identifier, rather than the beacon identifier, in one of a plurality of potential locations in the hash table such that no other beacon identifier having the checksum is stored in said one of the plurality of potential locations; and
   a processor programmed to:
      detect, by the mobile computing device, the at least one beacon within a proximity of the mobile computing device;
      identify, based on the beacon identifier of the at least one detected beacon, the plurality of potential locations in the hash table stored in the memory area;
      calculate the checksum of the beacon identifier for each of the identified plurality of potential locations;
      compare the calculated checksum for each of the identified plurality of potential locations with the checksum stored at the corresponding location in the hash table to identify a match at one of the plurality of potential locations; and
      obtain the beacon reference data associated with the calculated checksum at said one of the plurality of potential locations in the hash table stored in the memory area, wherein the mobile computing device determines a location of the mobile computing device based on the obtained beacon reference data.

2. The system of claim 1, wherein the memory area stores a plurality of hash tables, wherein each of the plurality of hash tables represents a group of one or more beacons located within a geographic area.

3. The system of claim 1, wherein the hash table stores the beacon reference data for one or more beacons located within a pre-defined geographic area.

4. The system of claim 1, wherein the beacon reference data comprises one or more of the following: a longitude value, latitude value, and an altitude value.

5. The system of claim 1, wherein the processor is further programmed to compare the obtained beacon reference data with domain information associated with the mobile computing device to validate the obtained beacon reference data.

6. The system of claim 1, further comprising determining the location of the mobile computing device based on the obtained beacon reference data.

7. The system of claim 1, further comprising means for obtaining the beacon reference data for beacons from a cuckoo hash table to infer a location of the mobile computing device.

8. The system of claim 1, further comprising means for obtaining the beacon reference data for beacons from a cuckoo hash table using checksums of the beacon identifiers.

9. A method comprising:
   accessing data associated with a beacon, said data including a beacon identifier and beacon reference data describing a location of the beacon;
   identifying, by a first computing device, a plurality of potential locations in a hash table for association with the beacon identifier;
   calculating a checksum of the beacon identifier for each of the identified locations;
   performing, by the first computing device, cuckoo hashing to store the beacon reference data and the calculated checksum of the beacon identifier in one of the identified plurality of potential locations in the hash table; and
   providing the hash table to a second computing device that retrieves the beacon reference data from the hash table via the calculated checksum in said one of the plurality of identified locations.

10. The method of claim 9, wherein accessing the data comprises accessing data associated with a plurality of beacons representing a wireless access point tile.

11. The method of claim 9, further comprising providing the hash table to a plurality of mobile computing devices.

12. The method of claim 9, wherein the beacon identifier comprises one or more of the following: a basic service set identifier (BSSID) and a service set identifier (SSID).

13. The method of claim 9, wherein performing the cuckoo hashing comprises finding a match between the beacon identifier and one of the identified plurality of potential locations such that no other beacon identifier is matched to said one of the identified plurality of potential locations.

14. The method of claim 9, wherein identifying the plurality of potential locations comprises calculating a plurality of hash functions.

15. One or more computer storage media storing computer-executable components, said components comprising:
   a memory component that when executed by at least one processor causes the at least one processor to store a plurality of hash tables, said hash tables corresponding to groups of beacons, each of the groups representing a geographic area, said hash tables storing beacon reference data describing locations of the beacons, wherein each of the beacons has a beacon identifier associated therewith, said plurality of hash tables being created by performing cuckoo hashing to store the beacon reference data and a checksum of the beacon identifier in one of a plurality of potential locations in the hash tables such that no other beacon identifier having the checksum is stored in said one of the plurality of potential locations;
   a detection component that when executed by at least one processor causes the at least one processor to detect one or more of the beacons within a proximity of a computing device;
   a rating component that when executed by at least one processor causes the at least one processor to calculate a score for each of the groups of beacons based at least on the beacons detected by the detection component, a beacon coverage rate, and an aliasing rate, said rating component further selecting at least one of the plurality of hash tables based on the calculated score;

a retrieval component that when executed by at least one processor causes the at least one processor to obtain the beacon reference data associated with the beacons detected by the detection component from the hash table selected by the rating component using checksums of the beacon identifiers; and a location component that when executed by at least one processor causes the at least one processor to determines a location of the computing device based on the beacon reference data obtained by the retrieval component.

16. The computer storage media of claim 15, wherein the memory component adjusts the aliasing rate based on the beacon coverage rate when storing the plurality of hash tables.

17. The computer storage readable media of claim 15, wherein the rating component adjusts the calculated score based on a cost associated with the aliasing rate.

18. The computer storage media of claim 15, wherein the rating component calculates the score for each of the groups based in part on whether the detected beacons are within the group.

19. The computer storage media of claim 15, wherein the aliasing rate corresponds to false positive matches of the detected beacons within the groups.

20. The computer storage media of claim 15, wherein the location component filters the obtained beacon reference data by outlier elimination prior to determining the location of the computing device.

* * * * *